(12) United States Patent
Banerjee et al.

(10) Patent No.: US 8,898,163 B2
(45) Date of Patent: Nov. 25, 2014

(54) REAL-TIME INFORMATION MINING

(75) Inventors: Nilanjan Banerjee, West Bengal (IN);
Dipanjan Chakraborty, Kolkata (IN);
Anupam Joshi, New Delhi (IN); Sumit Mittal, Uttar Pradesh (IN); Seema Nagar, New Delhi (IN); Angshu Rai, Bangalore (IN); Koustuv Dasgupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/025,521

(22) Filed: Feb. 11, 2011

(65) Prior Publication Data
US 2012/0209879 A1     Aug. 16, 2012

(51) Int. Cl.
*G06F 17/30* (2006.01)
*G06F 7/00* (2006.01)

(52) U.S. Cl.
CPC .............................. *G06F 17/30696* (2013.01)
USPC ............. 707/736; 707/740; 707/748; 706/45; 706/48

(58) Field of Classification Search
CPC ................ G06F 17/30867; G06F 17/30905; G06F 17/30761; G06F 17/30864; G06F 17/3087; G06F 17/30554
See application file for complete search history.

(56) References Cited

U.S. PATENT DOCUMENTS

| | | | |
|---|---|---|---|
| 7,107,254 B1 | 9/2006 | Dumais et al. | |
| 7,421,429 B2 | 9/2008 | Thota | |
| 2005/0108001 A1* | 5/2005 | Aarskog | 704/10 |
| 2006/0026114 A1 | 2/2006 | Gregoire et al. | |
| 2006/0074980 A1* | 4/2006 | Sarkar | 707/104.1 |
| 2008/0249762 A1 | 10/2008 | Wang et al. | |
| 2009/0006085 A1* | 1/2009 | Horvitz et al. | 704/223 |
| 2009/0177670 A1 | 7/2009 | Grenier et al. | |
| 2009/0276705 A1* | 11/2009 | Ozdemir et al. | 715/708 |
| 2010/0070448 A1* | 3/2010 | Omoigui | 706/47 |
| 2010/0082642 A1 | 4/2010 | Forman et al. | |
| 2010/0262454 A1* | 10/2010 | Sommer et al. | 705/10 |
| 2011/0258049 A1* | 10/2011 | Ramer et al. | 705/14.66 |
| 2011/0314011 A1* | 12/2011 | Buehrer et al. | 707/728 |
| 2012/0117092 A1 | 5/2012 | Stankiewicz et al. | |

OTHER PUBLICATIONS

Lu, Jiahui, et al., "Spectrum: Retrieving Different Points of View from the Blogosphere", May 17-19, 2009, pp. 114-121, Third International AAAI Conference on Weblogs and Social Media, San Jose, California, USA.

Mishne, Gilad, "Multiple Ranking Strategies for Opinion Retrieval in Blogs", Nov. 14-17, 2006, 4 pp., NIST Special Publication 500-272: The Fifteenth Text Retrieval Conference Proceedings (TREC 2006), Gaithersburg, Maryland, USA.

Locke, Brian and Martin, James, "Named Entity Recognition: Adapting to Microblogging", Apr. 25, 2009, 12 pp., Brian Locke, Senior Thesis, University of Colorado, USA.

(Continued)

*Primary Examiner* — Angelica Ruiz

(74) *Attorney, Agent, or Firm* — Ference & Associates LLC

(57) ABSTRACT

Embodiments of the invention are related to identifying a user's intent dynamically from at least a set of metadata associated with the user, wherein the set of metadata is associated with a user input, and providing to the user a set of labeled instances on determination of a user's intent, the set of labeled instances being directly related to user's intent, where the set of labeled instances are obtained in real-time from a set of information repositories.

19 Claims, 3 Drawing Sheets

(56) References Cited

OTHER PUBLICATIONS

Balijepalli, Sandeep, "Blogvox2: A Modular Domain Independent Sentiment Analysis System", 2007, 63 pp., Sandeep Balijepalli, Copyright submission, University of Maryland, USA.

Website, http://www.emeraldinsight.com/journals.htm?articleid=1747861&show=abstract, available as of Jan. 11, 2011, showing abstract of article by Cosh, Kenneth J., et al., "Content clouds: classifying content in Web 2.0", 2008, pp. 722-729, vol. 57, Issue 9, Emerald Group Publishing Limited, USA.

Java, Akshay. et al., "Why We Twitter: An Analysis of a Microblogging Community", Aug. 12-15, 2007, pp. 118-138, KDD'07—13th ACM SIGKDD International Conference on Knowledge Discovery and Data Mining, ACM, New York, NY, USA.

Sankaranarayanan, Jagan, et al., "TwitterStand: News in Tweets", Nov. 4-6, 2009, 10 pages, 17th ACM SIGSPATIAL International Conference on Advances in Geographic Information Systems, ACM, Seattle, WA, USA.

\* cited by examiner

REAL-TIME INFORMATION MINING

TECHNICAL FIELD

Embodiments of the invention are related to real-time information mining based on a user's intent.

BACKGROUND

With the mushrooming popularity of networking applications, it can be appreciated that a relatively large amount of user-related information has become publicly available, and such publicly available information can potentially be mined in real-time. However, such data mining presents challenges of identifying the right context and/or content (hereinafter also referred to as information or data) and devising techniques to extract such content based on a user context.

BRIEF SUMMARY

In summary, embodiments of the invention provide a method, a system and a computer program product for identifying a user's intent dynamically from at least a set of metadata associated with the user, wherein the set of metadata is associated with a user input, and providing to the user a set of labeled instances on determination of a user's intent, the set of labeled instances being directly related to user's intent, where the set of labeled instances are obtained in real-time from a set of information repositories. Other embodiments are also disclosed.

For a better understanding of the exemplary embodiments of the invention, together with other features and advantages thereof, reference is made to the following description, taken in conjunction with the accompanying drawings, and the scope of the claimed embodiments of the invention will be pointed out in the appended claims.

DETAILED DESCRIPTION

Figure 1:
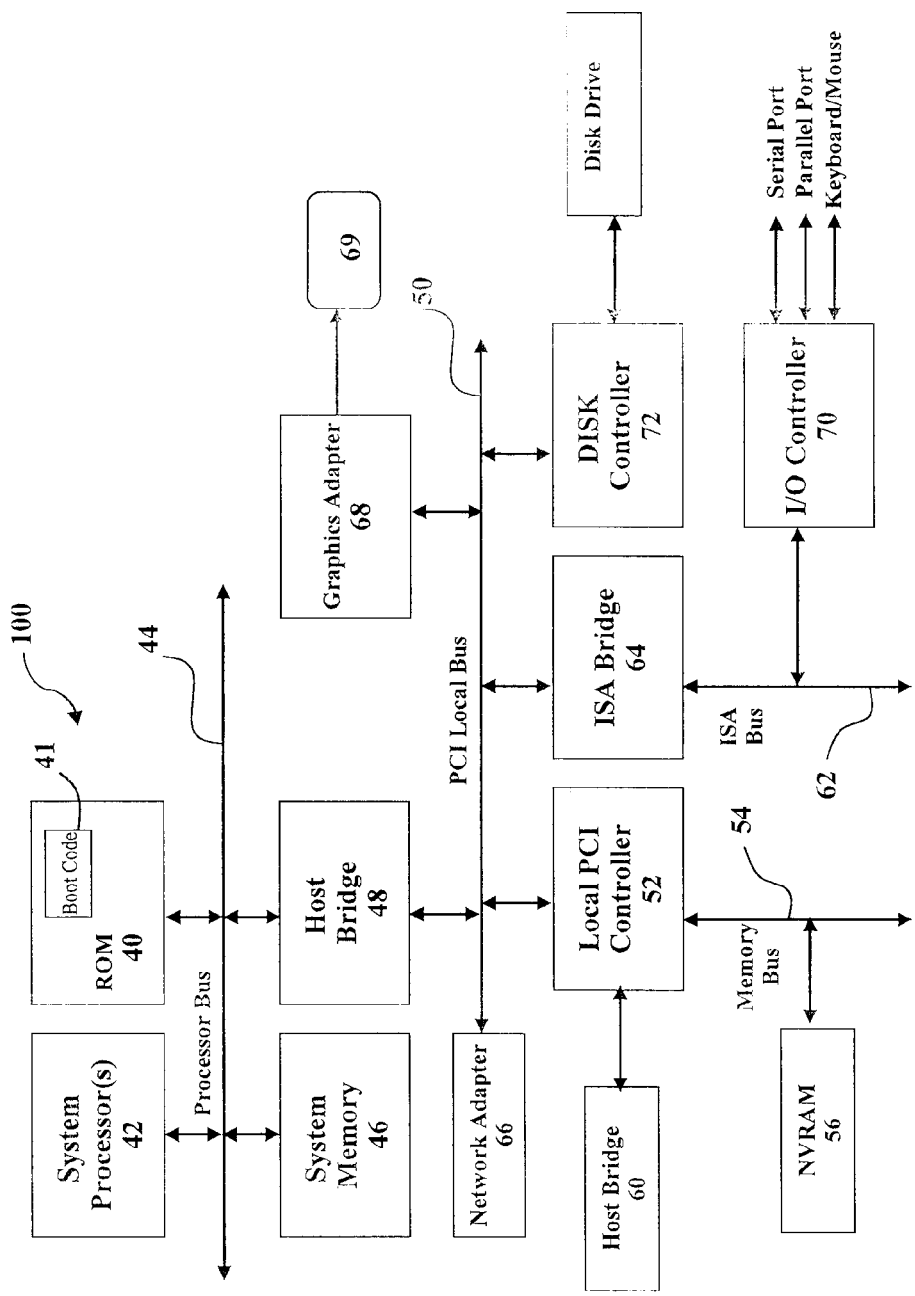
FIG. 1 illustrates an example computer system on which the invention may be implemented.

It will be readily understood that the components of the embodiments of the invention, as generally described and illustrated in the figures herein, may be arranged and designed in a wide variety of different configurations in addition to the example embodiments described herein. Thus, the following more detailed description of the embodiments of the invention, as represented in the figures, is not intended to limit the scope of the embodiments of the invention, as claimed, but is merely representative of example embodiments of the invention.

Reference throughout this specification to "one embodiment" or "an embodiment" or the like is intended to mean that a particular feature, structure, or characteristic described in connection with the example embodiment is included in at least one embodiment of the invention. Thus, appearances of the phrases "in one embodiment" or "in an embodiment" or the like in various places throughout this specification are not necessarily all referring to the same embodiment.

Furthermore, the features, structures, or characteristics described herein may be combined in any suitable manner in one or more embodiments. In the following description, numerous specific details are provided to give a thorough understanding of embodiments of the invention. It will be apparent to a person skilled in the art that the various embodiments of the invention disclosed herein might be practiced without one or more of the specific details, or with other methods, components, materials et cetera. Also, in other instances, well-known structures, materials, or operations are not shown or described in detail to avoid obscuring aspects of the invention.

The example embodiments of the invention as illustrated will be best understood by reference to the figures. The following description is intended only by way of example and simply illustrates certain selected example embodiments of the invention as claimed herein. It should be noted that the flowchart and block diagrams in the figures illustrate the architecture, functionality, and operation of possible implementations of systems, apparatuses, methods and computer program products according to various example embodiments of the invention. In this regard, each block in the flowchart or block diagrams may represent a module, segment, or portion of code, consisting of one or more executable instructions for implementing the specified logical function(s).

It should also be noted that, in some alternative implementations, the functions noted in the block may occur in a different order in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference is now made to FIG. 1, which depicts a block diagram of an example embodiment of a computer system 100 (any data processing system including at least a processor and a memory, capable of processing information/data). The example computer system depicted in FIG. 1 in one embodiment consists of a device having at least a processor and a memory, and for example covers electronic devices such as a laptop or desktop personal computers, mobile/smart phones, PDAs or the like. As is apparent from the description, however, embodiments of the invention may be implemented in any appropriately configured device, as described herein.

As illustrated in FIG. 1, the computer system 100 includes at least one system processor 42, which is coupled to a Read-Only Memory (ROM) 40 and a system memory 46 by a bus 44, preferably a processor bus. The system processor 42 may include at least one of the AMD line of processors produced by AMD Corporation or a processor produced by INTEL Corporation or a processor produced by International Business Machines Corporation, such as a POWER processor, and is typically a general-purpose processor that executes boot code 41 stored within a ROM 40 at power-on and thereafter processes data under the control of an operating system (not explicitly shown in the figure) and application software (not explicitly shown in the figure) stored in a system memory 46. The system processor 42 is coupled via a bus 44 and a host bridge 48 to a Peripheral Component Interconnect (PCI) local bus 50.

The PCI local bus 50 supports the attachment of a number of devices, including adapters and bridges. Among these devices is a network adapter 66, which interfaces the computer system 100 to a LAN, and a graphics adapter 68, which interfaces the computer system 100 to a display 69. Communication on the PCI local bus 50 is governed by a local PCI controller 52, which is in turn coupled to a non-volatile random access memory (NVRAM) 56 via a memory bus 54. The local PCI controller 52 can be coupled to additional buses and devices via a second host bridge 60.

The computer system 100 further includes an Industry Standard Architecture (ISA) bus 62, which is coupled to the PCI local bus 50 by an ISA bridge 64. Coupled to the ISA bus 62 is an input/output (I/O) controller 70, which controls communication between the computer system 100 and attached peripheral devices such as a as a keyboard, a mouse, serial and parallel ports, et cetera. A disk controller 72 connects a disk drive with the PCI local bus 50. A USB Bus and a USB Controller (not explicitly shown in the figure) are part of the Local PCI controller 52.

A significant recent trend in the internet and mobile telephony has been the dominance of user generated content. Mobile technology has permitted users to upload content onto various information repositories. Networking sites are configured to provide an easy access and manageable medium for users to share content, which may eventually form a portal for media-rich exchange of content between users. For example, it has been found that much information of what is exchanged by users is context-sensitive information, and such information can range from users' moods and opinions, to communication about users' plans et cetera. Some networking systems require users to explicitly organize information in connection with other users, and such an arrangement does not permit the automatic extraction of user context from multiple sources.

Broadly contemplated herein, in accordance with at least one embodiment of the invention, is the use of data mining for mining content from information repositories, where these information repositories may include publicly available information, and where the principles of noisy text mining and classification can be built upon and advantageously used. More particularly, embodiments of the invention broadly encompass the implementation of techniques that leverage and improve upon conventional text mining techniques (such as N-gram, TF-IDF, k-means clustering, Part-of-Speech taggers), which efficiently classify a stream of information in real-time.

Accordingly, broadly addressed and ascertained is for example the nature of intentions of the users expressed in information available in the information repositories, as well as developing and/or employing classification techniques for characterizing such intentions of the users. Preferably, in accordance with at least one embodiment of the invention, there is employed an ensemble approach towards classifying information in real-time, and scaling such information in real-time.

Some challenges present themselves in connection with text mining and classification for RTI analysis in information; some of these challenges include, but are by no means limited to the following.

Limited context information. Information available is restricted to a small number of characters (e.g., 140 characters or the like), which provides a very short context window that is normally out of reach for conventional knowledge extraction algorithms.

Extreme noise. The variety of conceivable information available, and the quantities in which they are streamed, make data mining and extraction difficult. For example, information can include, but by no means be limited to a user's daily activities, conversations, discussions (e.g. using hashtags), URL postings or mentionings, and what may be characterized as "random thoughts" (e.g., moods or feedbacks).

Informal or highly colloquial linguistic usage. In networking sites, the use of language can sometime be very informal. Particularly, language can present itself as grammatically incorrect, and/or contain errors in spellings, as well as spoken and morphological variants. In conventional mining/extraction arrangements, grammatical correctness is normally assumed, which makes it even more difficult to mine in real-time.

Scalability. Preferably, a classifier will work well under time constraints, scaling to real publish rates, minimally trading off classifier accuracy with computation time to detect a user's real-time intention.

As understood for purposes of discussion herein, a real-time intention (RTI) may be defined as a text expression containing one or more content-indicative words providing type of intent, with zero or more usage-indicative words that further qualify the intent, having no specific ordering. Intuitively, this definition covers a range of expressions to characterize RTIs in a single stream of information without any grammatical constraints.

A content-indicative word (CI word), on the other hand, may be defined as a keyword that carries or indicates a central subject or topic in a RTI. Further, a usage-indicative word (UI word) may be defined as a keyword that characterizes the activity associated with a particular CI word. A CI word can additionally be classified as a T-word (temporal keyword, such as "evening" or "afternoon", or an A-word (action keyword), that qualifies a dimension and activity associated with a CI word.

By way of an illustrative and non-restrictive example herein, any website or information repository may be considered. Information repositories or websites involves the posting of information, which may be text based, such as a message with a limitation of 140 characters or less, and the message posted by users are received by "followers" of the user. It should be understood, however, that embodiments of the invention embrace a great variety of networking and that the discussion herein can be construed to cover any and all such media. For instance, discussions of "messages" (information type) herein can be considered to be equally relevant to status updates or other postings on repositories that permit friends and acquaintances of a user to ascertain what a user is doing or intending to do at a given point in time.

In accordance with an example embodiment of the invention, all information is processed as a triple: <user name, information type, posting time>. In order to extract CI and UI words and CI-UI associations, in accordance with at least one embodiment, the process formulates a seed set, or a set of 5 broad categories of user interests to ascertain the RTIs. The seed set intuitively forms a bonafide, or correctly spelled, set of well known and representative CI and UI words and as described below, assists in mining.

Suitable categories (which may be termed CI categories), in accordance with an example embodiment, include: Movies, Sports, Music, Foods, Dances et cetera. In an example embodiment, the seed set includes at least the following keywords: time, today, come, try, show, home, tonight, week, check, getting, morning, read, watching, tomorrow, happy, feel, fun, watch, live, video, and music.

In an example embodiment of the invention, new CI and UI words are discovered and the seed set is enhanced. In one technique for enhancing the seed set, the process discovers morphological variants and words semantically equivalent to words in the seed set using a context-based search technique. To do this, the process treats each information repository as a single short document and considers a context window of length "l" around each occurrence of word "w" in the collection of documents. A context vector of word "w" is built with normalized Term Frequency-Inverse Document Frequency (TF-IDF) weights of all other words "w" in the context window of length "l", thus taking into account word importance and frequency. Further, the process uses a cosine similarity measure to find words that have similarity above a certain threshold with the words in a set.

In accordance with at least one embodiment of the invention, a context window of 5 words reasonably captures synonyms, hyponyms and hypernyms of the seed set. Manual inspection and review may also be employed to determine additional keywords to include in the seed set. Further, in at least one embodiment of the invention, a Part-of-speech (POS) analyzer is used to discover A-words. The technique locates and ranks the different grammatical roles of words (nouns, verbs, adverbs et cetera) that appear along with the CI and T-words. Further, the process uses a correlation measure to identify A-words that show high correlation with CI words. Correlation between a CI word, "cw", and an A-word "aw" is measured using the formula $$\text{Correlation } (cw, aw) = \frac{|A \cap B|/N}{(|A|/N) * (|B|/N)}, \quad (1)$$

where N is the total number of information repositories, A is the set of repositories containing "cw", and B is the set of repositories containing "aw".

In accordance with at least one embodiment of the invention, new activity specific A-words are added to UI words in the seed set. This forms the dictionary for discovering CI and UI word associations. In an example embodiment of the invention, relationships between CI words and UI words are investigated to gain insights on patterns for classification techniques to use for RTI detection. It can be demonstrated that the probability of a information repository containing a RTI should increase with:

(1) Occurrences of CI and/or UI words; and
(2) Occurrences of patterns that frequently indicate RTIs.

In accordance with at least one embodiment of the invention, to reveal associations of words to the semantic meaning of a tweet, the process uses k-means clustering to group relevant information/content together, employing a data mining workbench containing inbuilt features for cluster analysis.

In at least one embodiment of the invention, during clustering, the process employs a set of "stop words" that include words (e.g. prepositions, conjunctions, select adjectives and irrelevant proper nouns like http) that would not be relevant to an RTI analysis. The process further supplies the cluster formation with additional context by specifying synonymous CI words in each category. A k-means technique considers all these synonyms as semantically similar. This allows the process to gather all information/content containing semantically similar words in one cluster.

In at least one embodiment of the invention, the process runs the k-means clustering with a dictionary size of 12,000 words and k having about 200 as the number of clusters. The clusters can be dynamically tagged with highly frequent words (e.g. "dinner", "game", "movie" et cetera), helping to identify clusters where real-time user intentions can potentially be uncovered. The process iterates a few times and modifies the k value and dictionary size to avoid irrelevant clusters, i.e., wherein the information/content do not appear to carry a sense of real-time user interests.

In accordance with at least one embodiment of the invention classification techniques for capturing RTIs in the information repositories is discussed. There are broadly contemplated, in accordance with embodiments of the invention, a variety of analyzers, or real-time information/content (RT) classifiers, configured for capturing different representational variations of RTIs and NIs (non-intentions, i.e., communications or messages, or portions thereof, that do not convey a user intention) in the information.

In at least one embodiment of the invention, an ensemble approach may be employed to combine results from these analyzers to build classifiers. As such, in at least one embodiment of the invention, five individual analyzers are variously employed and combined to analyze and classify real-time messages or communications. A Co-occurrence Driven Analyzer represents a simple method for inferring the relevance of documents, based on the following intuition—if more relevant words co-occur in information posted then the likelihood of the document expressing intents increase. This intuition has been validated by word association results and empirical observations on the labeled data. For each incoming information/content, output of this analyzer is—Number of A-Words ($N_{a\text{-}word}$); Number of T-Words ($N_{t\text{-}word}$); Number of CI-(A-Word) co-occurrences ($N_{ci\text{-}a\text{-}cooccur}$); Number of CI-(T-Word) co-occurrences ($N_{ci\text{-}t\text{-}cooccur}$); Number of A-Word-(T-Word) co-occurrences ($N_{a\text{-}t\text{-}cooccur}$)

A POS-driven Analyzer exploits the grammatical constructs in the documents. Although most of the information lacks grammatical accuracy, a process can exploit the fact that at a sub-sentence level, a user is likely to arrange words in correct grammatical order. For instance, consider information such as, "me want to watch movie tonight" or "me hungry got to eat something". Though both examples lack grammatical correctness, the words are more or less in correct grammatical form and are ordered around the intention of the user. Wherever present, by use of POS tagging, these sub-sentence grammatical constructs around the CI words can be captured. Verb tense is considered as well. For each incoming information/data/content, output of this analyzer is Number of Verbs ($N_{verb}$), position; Number of Nouns ($N_{noun}$), position; Number of past tense verbs ($N_{past\text{-}tense\text{-}verb}$), position; where position is either before or after.

A Rule Based Analyzer specifies rules that identify common words, phrases used by authors to express RTIs and NIs. For instance, such an analyzer can involve collecting category-specific A-words and frequent patterns observed during a manual labeling process for both RTIs and NIs. A set of user intent favorable rules (RTI-Rules) and non-intent favorable rules (NI-Rules) can be formed, wherein the NI-Rules set also contain negative sentiment words such as "can't", "won't", "never", et cetera. For each incoming information (such as a message) the output is Number of RTI-Rules matched of type i ($N_{RTI\text{-}rules\text{-}i}$) for i=1 ... |RTI-Rules|; Number of NI-Rules matched of type j($N_{NI\text{-}rules\text{-}j}$) for j=1 ... |NI-Rules|; Number of RTI-favorable words ($N_{RTIword}$) and phrases ($N_{TRI\text{-}phrase}$); Number of NI-favorable words ($N_{NIword}$ and phrases ($N_{NI\text{-}phrase}$)).

A Dependency Grammar Based Analyzer uses dependency parser driven pattern discovery to identify hidden patterns in RTI set and NI set—patterns that cannot be captured by the simpler co-occurrence and POS analyzers. Dependency parsers exploit hidden relationships between words (e.g. how many intermediate words separate two frequently occurring words) and are able to capture them. This type of analyzer can parse documents from the RTI set and obtain tokens that contain link, number of gaps, and words themselves. Through word substitution (e.g., replace CI-words with the CI category name, A-words with "action"), similar (in terms of grammatical expression) tokens may be converted to a common token. This enables one to account for the actual frequency of tokens of such expressions. The analyzer can then use RTI and NI sets to perform frequent pattern analysis to obtain a set of frequently occurring expressions (RTI-Patterns, NI-Patterns). A Frequency Pattern Growth technique can then be used to obtain these token patterns. For each incoming information (message), the output from this analyzer is: Number of patterns matched of type d ($N_{patterns-d}$) for d=1 ... |RTI-Patterns|

Finally, a Δ-TFIDF Based Analyzer captures words whose usage is heavily biased towards either one of the sets. Δ-TFIDF driven SVM models have been known to improve performance in sentiment analysis in large documents. To do this, the process, in accordance with embodiments of the invention, computes TF-IDF values for different words separately for the RTI set and NI set for each category. Then the difference of two sets of TF-IDF values is assigned to each word as the Δ-TFIDF value. For non-discriminating words, Δ-TFIDF scores are closer to 0. For each incoming information, the output is a vector $V=[\Delta_1, \Delta_2 \ldots \Delta_n]$, where n is the number of distinct words in the information, and $\Delta_i$=Δ-TFIDF value for word $w_i$.

Broadly contemplated herein, in accordance with embodiments of the invention, are three approaches that utilize the output of the five analyzers to classify information repositories. A first approach, or voting approach, considers each analyzer as contributing some bias to the final class value of an in-coming micro-blog. Each information repository passes through five analyzers and obtains five relevance scores. Relevance $R_{ci}$ is the confidence given by an Analyzer to contain an RTI for a category ci. The relevance for each analyzer is defined as follows:

Co-Occurence Analyzer:

$$R_{ci} \propto (N_{a-word}) + (N_{t-word}) \tag{2}$$

POS Based Analyzer:

$$R_{ci} \propto (N_{verb} + N_{noun}) - k * N_{past-tense-verb} \tag{3}$$

Rule Based Analyzer:

$$R_{ci} \propto \sum_{i=1}^{\alpha} k_i * N_{RTI-rules-i} - \sum_{j=1}^{\beta} k_j * N_{NI-rules-j} \tag{4}$$

where $k_i, k_j$=set of internal constant parameters; α=|RTI-Rules|, β=|NI-Rules|.

Dependency Grammar Based Analyzer:

$$R_{ci} \propto \sum_{d=1}^{Max\rho} N_{patterns-d} \tag{5}$$

where Max ρ=|RTI-Patterns|.

Δ-TFIDF Based Analyzer—The process trains a SVM with the $[\Delta_1, \Delta_2 \ldots \Delta_n]$ values from selected labeled datasets and uses the class values predicted by the SVM as $R_{ci}$.

The process then computes a combined relevance value $$S = \Sigma_{i=1}^{5} w_i * R_{ci} \tag{6}$$

where $w_i$ are the analyzer weights. An information repository is classified as an RTI if S>discrimination threshold τ; and as a NI otherwise. To determine suitable values of the proportionality constants (and internal parameters of the analyzers) for S, the process computes the F1 score for different combinations of analyzer weights and internal parameters, for each analyzer. The parameter combination that gives the highest F1 score is set for it.

A first alternative to the voting approach is a "Late Fusion SVM" approach. In this approach, the output of each analyzer is treated as a feature vector V. The process builds individual SVM models for each of the analyzers using V from training data. For each test information m, SV $M_i$ outputs a tuple $<class_{mi}, \rho_i>$, where $class_{mi}$=RTI, NI probability predicted by SV $M_i$; ρ=prediction accuracy of SV $M_i$. Final Relevance value is given as $$S = \Sigma_{i=1}^{5} p_i * class_{mi} \tag{7}$$

m is an RTI if S>τ.

A second alternative to the voting approach is an "Early Fusion SVM" approach. This uses features generated by all analyzers together to build a single SVM model. The prediction probabilities are used to assign class values after comparison with τ.

From the foregoing, it will be readily appreciated that, in accordance with embodiments of the invention, a process of real-time intention mining is able to handle large variations in expressions for intentions and informal language usage, balance between high accuracy and fast processing, and easily filter out or remove non-intentions In accordance with at least one embodiment of the invention, classification techniques readily configured for information and information repositories are able to address the issues of variation in expression, incorrect use of grammar, and inherent complexities of natural language. Further, new analyzers can be readily plugged in when appropriate, as new classification techniques are developed.

Figure 2:
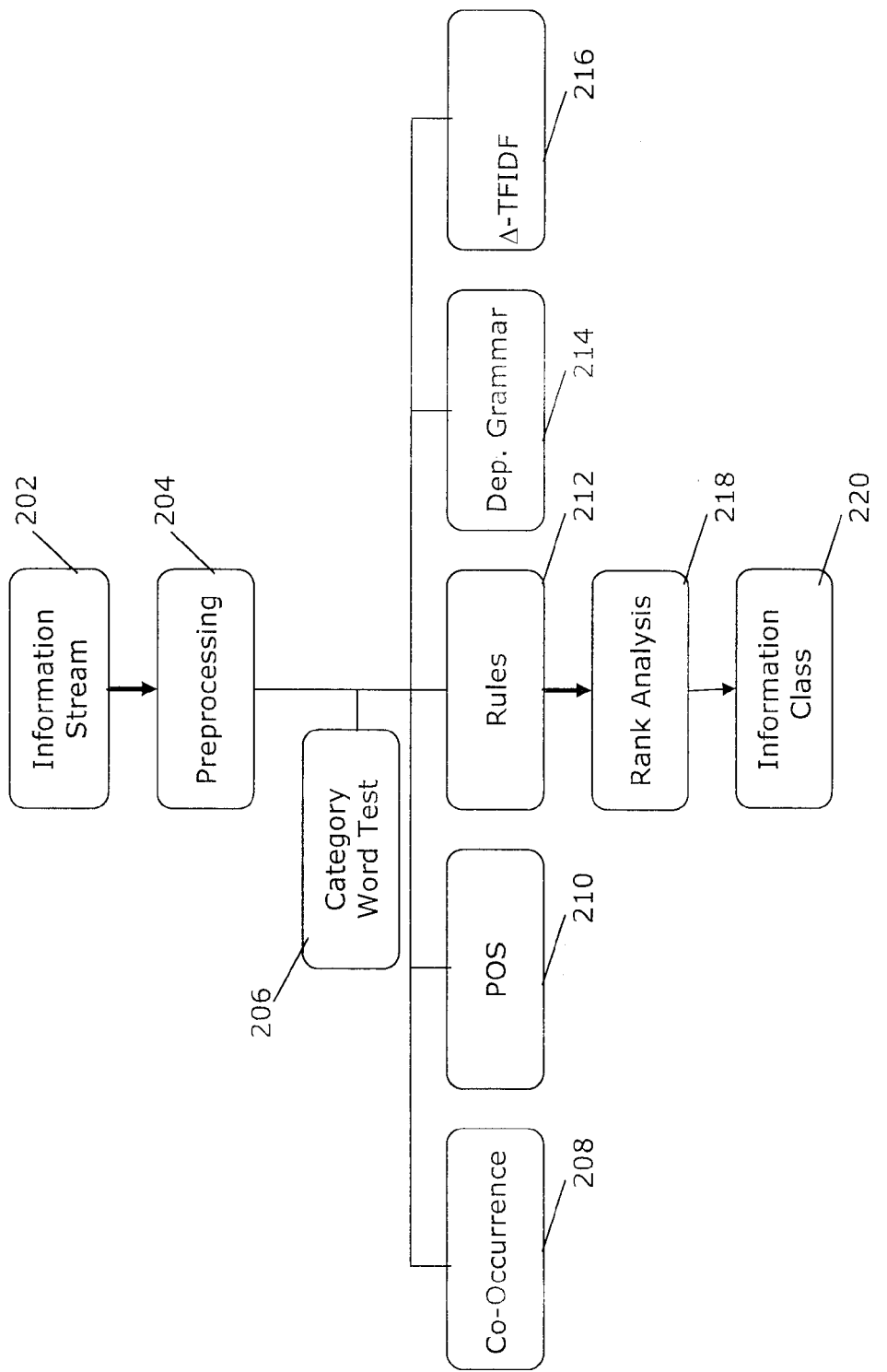
FIG. 2 illustrates an example embodiment of a process and arrangement for analyzing and classifying content or information in real-time.

With reference to FIG. 2, in accordance with an example embodiment of the invention, a pre-processor unit 204 extracts from a streaming message (information) 202 a metadata author name and a time stamp, and performs some cleansing (e.g. removes stop words) of the tweet.

A category filtering unit 206 then tests the message or information for the presence of at least one category and discards the ones that do not satisfy predetermined criteria (as can be appreciated from the foregoing discussion). Thereafter, a serial or parallel evaluation of filtered information is undertaken by multiple analyzers. Parallel evaluation is shown in FIG. 2. By way of non-restrictive and illustrative example, the parallel analyzers shown in FIG. 2 (all of which are discussed in detail further above) are: a co-occurrence-driven analyzer 208, a POS-driven analyzer 210, a rule-based analyzer 212, a dependency grammar-based analyzer 214, and a Δ-TFIDF-based analyzer 216.

An ensemble approach in accordance with at least one embodiment of the invention is employed to combine results of the multiple classifiers (or analyzers) 208-216 to rank the information or information repository 202. A rank analyzer 218 assigns different weights to the different analyzers (or the weights alternatively can have been assigned and appended to the individual analyzers 208-216 previously) and takes the weighted sum of the values assigned by each analyzer 208-216. In accordance with embodiments of the invention, the weights and internal parameters (if any) for each technique represented by the analyzers 208-216 is determined using an F1 score. A decision ("message" or "message class" or "information" 220) is made based on the weighted sum of values and compared to a threshold, as can be more fully appreciated further above.

It should be appreciated that a process such as that broadly illustrated in FIG. 2 can be carried out on essentially any suitable computer system or set of computer systems, which may, by way of an illustrative and on-restrictive example, include a system 100 indicated such as in FIG. 1. In accordance with an example embodiment, most if not all of the process steps discussed with respect to FIG. 2 can be performed by way of system processors 42 and system memory 46 indicated in FIG. 1.

Figure 3:
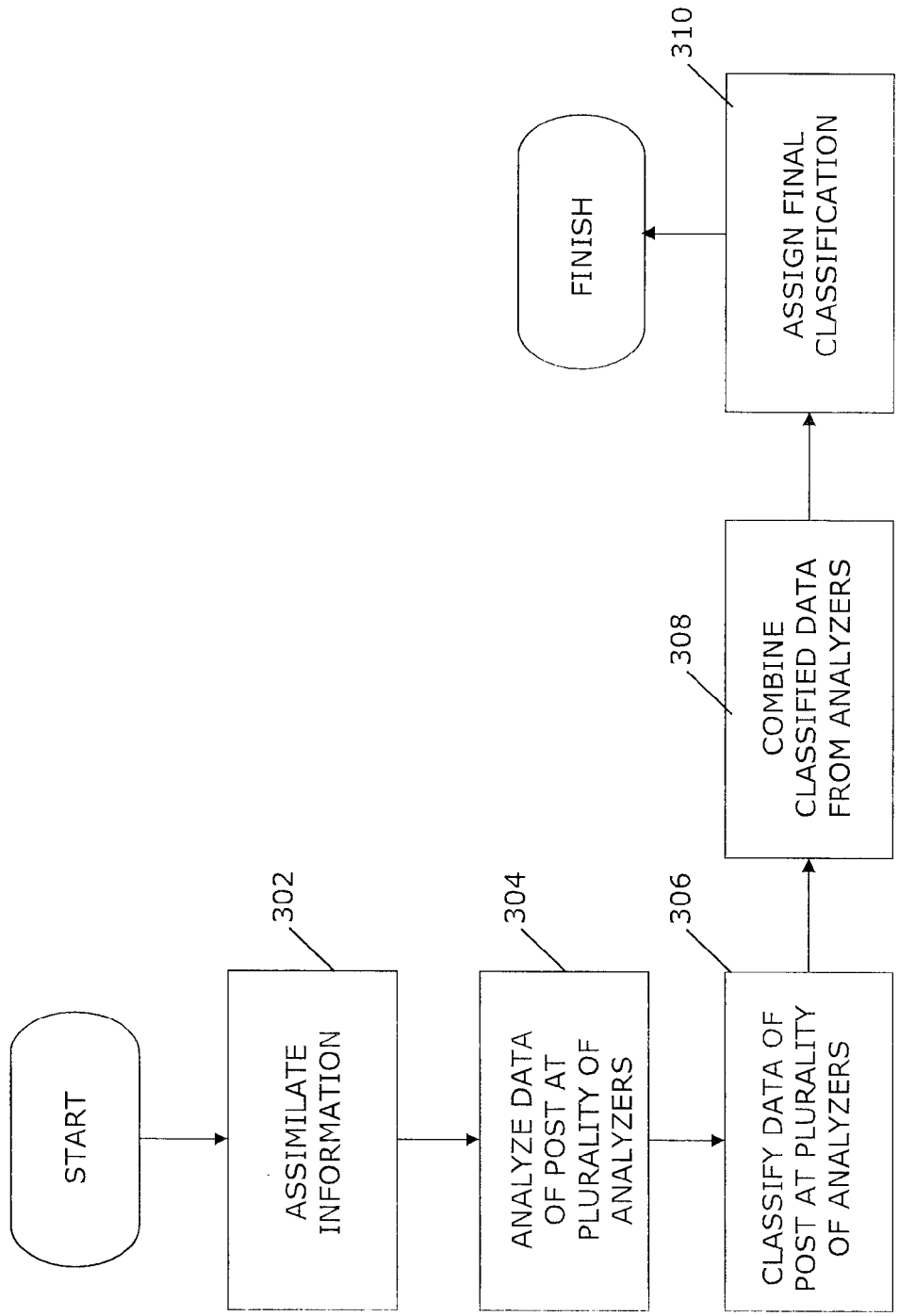
FIG. 3 is an example embodiment of a general process for classifying information or content.

For its part, FIG. 3 sets forth a process more generally for classifying information posts, in accordance with at least one embodiment of the present invention. It should be appreciated that a process such as that broadly illustrated in FIG. 3 can be carried out on essentially any suitable computer system or set of computer systems, which may, by way of an illustrative and on-restrictive example, include a system 100 such as in FIG. 1. In accordance with an example embodiment, most if not all of the process steps discussed with respect to FIG. 3 can be performed by way of system processors 42 and system memory 46 indicated in FIG. 1.

As shown in FIG. 3, an information or an information post is first assimilated (302) and data of the information post is classified at each of a plurality of analyzers (304). Data of the information post is then classified at each of the plurality of analyzers (306), and the classified data from each of the plurality of analyzers are combined (308). Finally, a final classification is assigned to the combined classified data (310).

It should be noted that aspects of the invention may be embodied as a system, method or computer program product. Accordingly, aspects of the invention may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   identifying a user associated with a text expression containing one or more content-indicative words;
   classifying data of the text expression using one or more classifiers, said classifying comprising using the one or more content-indicative words to identify an intent of a user, the intent comprising a semantic meaning of the text expression, the one or more content-indicative words including one or more of: at least one temporal keyword, and at least one action keyword; and
   on determination of intent of a user based on said identifying and classifying, providing to the user data related to the intent of the user obtained in real-time from a set of information repositories;
   wherein the intent of the user comprises at least one of structured data and unstructured data; and
   said classifying comprises employing a Δ-TFIDF based analyzer and at least one classifier selected from the group consisting of: a co-occurrence driven analyzer; a part-of-speech analyzer; a rule-based analyzer; a dependency grammar based analyzer.

2. The method as claimed in claim 1, further comprising identifying the intent of the user from at least a set of metadata associated with the user, wherein the set of metadata is associated with user input.

3. The method as claimed in claim 2, further comprising:
   analyzing the user input comprising the set of metadata based to ascertain an intention associated with the user;
   based on the intention ascertained, obtaining the data related to the intent of the user in real-time from a set of information repositories; and
   providing the data related to the intent of the user to the user.

4. The method as claimed in claim 2, wherein the user input comprises at least one input associated with one or more of: an email, an instant message, a short message, a telephone call, and a browser.

5. The method as claimed in claim 4, wherein the user input is composed on a user device.

6. The method as claimed in claim 5, wherein:
   the user intent is dynamically determined from the user input; and
   the one or more content-indicative words include at least one temporal keyword.

7. The method as claimed in claim 5, wherein the user input is transmitted from a user device; and
   the one or more content-indicative words include at least one temporal keyword and at least one action keyword.

8. The method as claimed in claim 3, wherein the analysis of the set of metadata is based on at least a set of pre-defined rules.

9. The method as claimed in claim 3, wherein said obtaining the data related to the intent of the user in real-time from a set of information repositories comprises: connecting to a network, wherein the network comprises the information repositories; and mining the information repositories.

10. The method as claimed in claim 9, further comprising:
    classifying a set of metadata into pre-defined categories;
    mapping the pre-defined categories in real-time with the intent of the user to ascertain the data related to the intent of the user.

11. A system comprising:
    at least a processor; and
    a memory;
    wherein said at least one processor and said memory are configured to:
    identify a user associated with a text expression containing one or more content-indicative words;
    classify data of the text expression using one or more classifiers, said classifying comprising using the one or more content-indicative words to identify an intent of a user, the intent comprising a semantic meaning of the text expression, the one or more content-indicative words including one or more of: at least one temporal keyword, and at least one action keyword; and
    provide to the user data related to the intent of the user obtained in real-time from a set of information repositories;
    wherein the intent of the user comprises at least one of structured data and unstructured data; and
    to classify comprises employing a Δ-TFIDF based analyzer and at least one classifier selected from the group consisting of: a co-occurrence driven analyzer; a part-of-speech analyzer; a rule-based analyzer; a dependency grammar based analyzer.

12. The system as claimed in claim 11, wherein said at least one processor and said memory are further configured to identify the intent of the user from at least a set of metadata associated with the user, wherein the set of metadata is associated with a user input.

13. The system as claimed in claim 12, wherein said at least one processor and said memory are further configured to analyze the user input comprising the set of metadata to ascertain an intention associated with the user;
    based on the intention ascertained, obtain the data related to the intent of the user in real-time from a set of information repositories; and
    provide the data related to the intent of the user to the user.

14. The system as claimed in claim 12, wherein the user input comprises at least one input associated with one or more of: an email, an instant message, a short message, a telephone call, and a browser, wherein the user input is composed on a user device, and wherein the intent of the user is dynamically determined from the user input.

15. The system as claimed in claim 13, wherein analysis of the set of metadata is based on at least a set of pre-defined rules.

16. The system as claimed in claim 11, wherein to obtain the data related to the intent of the user in real-time from a set of information repositories comprises:
    connecting to a network, wherein the network comprises the information repositories; and
    mining the information repositories.

17. The system as claimed in claim 11, wherein said at least one processor and said memory are further configured to:
    classify a set of metadata into pre-defined categories; and
    mapping the pre-defined categories in real-time with the intent of the user to ascertain the data related to the intent of the user.

18. A computer program product, comprising:
a computer readable storage medium having computer readable program code embodied therewith and executable by at least one processor, the computer readable program code comprising:
computer readable program code configured to:
  identify a user associated with a text expression containing one or more content-indicative words;
  classify data of the text expression using one or more classifiers, said classifying comprising using the one or more content-indicative words to identify an intent of a user, the intent comprising a semantic meaning of the text expression, the one or more content-indicative words including one or more of: at least one temporal keyword, and at least one action keyword; and
  provide to the user data related to the intent of the user;
  wherein the intent of the user comprises at least one of structured data and unstructured data; and
  to classify comprises employing a $\Delta$-TFIDF based analyzer and at least one classifier selected from the group consisting of: a co-occurrence driven analyzer; a part-of-speech analyzer; a rule-based analyzer; a dependency grammar based analyzer.

19. The computer program product of claim 18, wherein the text expression is a short text expression not more than 140 characters.

* * * * *